(12) United States Patent
Baxendell et al.

(10) Patent No.: US 8,757,191 B2
(45) Date of Patent: Jun. 24, 2014

(54) HIGH RATE DISCHARGE (HRD) VALVE OPENING MECHANISM FOR A FIRE AND EXPLOSION PROTECTION

(75) Inventors: Doug John Baxendell, Clayton, NC (US); Rusty Rose, Goldsboro, NC (US); Daniel Ray MacLachlan, Wilson, NC (US)

(73) Assignee: Kiddie Technologies, Inc., Wilson, NC (US)

( * ) Notice: Subject to any disclaimer, the term of this patent is extended or adjusted under 35 U.S.C. 154(b) by 249 days.

(21) Appl. No.: 13/314,852

(22) Filed: Dec. 8, 2011

(65) Prior Publication Data

US 2013/0146314 A1    Jun. 13, 2013

(51) Int. Cl.
*F16K 17/14*    (2006.01)

(52) U.S. Cl.
USPC ............ 137/68.13; 137/467; 251/68; 251/73; 251/74; 169/61; 169/62

(58) Field of Classification Search
USPC ............... 137/68.13, 467; 251/66, 68, 73, 74; 169/62, 61
See application file for complete search history.

(56) References Cited

U.S. PATENT DOCUMENTS

| | | | | |
|---|---|---|---|---|
| 101,814 A | * | 4/1870 | Black | 137/494 |
| 971,089 A | * | 9/1910 | Stankiewicz | 169/19 |
| 1,026,262 A | * | 5/1912 | Hasty | 137/76 |
| 1,606,191 A | * | 11/1926 | Siebenmann | 251/74 |
| 2,973,776 A | * | 3/1961 | Allen | 137/467 |
| 2,997,051 A | * | 8/1961 | Williams | 137/68.13 |
| 3,095,901 A | * | 7/1963 | Larson et al. | 137/522 |
| 3,111,133 A | * | 11/1963 | Fulton et al. | 137/68.13 |
| 3,113,172 A | * | 12/1963 | Barr | 174/11 R |
| 3,260,272 A | * | 7/1966 | Eckardt | 137/68.13 |
| 3,567,245 A | * | 3/1971 | Ekstrom | 280/737 |
| 3,744,816 A | * | 7/1973 | Yamaguchi et al. | 280/737 |
| 3,774,807 A | * | 11/1973 | Keathley et al. | 222/3 |
| 3,788,596 A | * | 1/1974 | Maeda | 251/69 |
| 3,874,400 A | * | 4/1975 | Groh | 137/68.13 |
| 3,897,799 A | * | 8/1975 | Lee | 137/68.13 |
| 3,924,688 A | * | 12/1975 | Cooper et al. | 169/61 |
| 3,951,428 A | * | 4/1976 | Sugiura et al. | 280/737 |
| 4,003,395 A | * | 1/1977 | Tyler | 137/68.13 |
| 4,159,744 A | | 7/1979 | Monte et al. | |

(Continued)

FOREIGN PATENT DOCUMENTS

| | | |
|---|---|---|
| JP | 3062954 B2 | 7/2000 |
| KR | 100319545 | 8/2002 |

OTHER PUBLICATIONS

The Korean Notice of Preliminary Rejection mailed Sep. 30, 2013 for Korean Patent Application No. 10-2012-120336.

(Continued)

*Primary Examiner* — Stephen M Hepperle
*Assistant Examiner* — Minh Le
(74) *Attorney, Agent, or Firm* — Kinney & Lange, P.A.

(57) ABSTRACT

A valve actuation mechanism has a plurality of links. Each link has a proximal end and distal end, and the links are disposed adjacent a valve member. The actuation mechanism also has at least one roller connected to the distal ends of at least two links. The roller contacts a surface of the valve member. In addition, at least one pivot for each link is present in the valve, wherein each pivot is positioned on the proximal end of each of the plurality of links.

8 Claims, 6 Drawing Sheets

(56) References Cited

U.S. PATENT DOCUMENTS

| | | | |
|---|---|---|---|
| 4,208,032 A * | 6/1980 | Mineur | 251/69 |
| 4,288,005 A * | 9/1981 | Soo-Hoo | 222/5 |
| 4,421,005 A * | 12/1983 | Byrne | 89/1.14 |
| 4,469,125 A * | 9/1984 | Keeney | 137/467 |
| 4,561,630 A * | 12/1985 | McCulloch | 251/84 |
| 4,579,136 A * | 4/1986 | Oman et al. | 137/68.13 |
| 4,579,315 A | 4/1986 | Kowalski | |
| 4,691,736 A | 9/1987 | Kowalski | |
| 4,841,788 A * | 6/1989 | Thuries et al. | 74/2 |
| 5,169,119 A * | 12/1992 | Duggal et al. | 251/74 |
| 5,305,914 A * | 4/1994 | Hoo et al. | 222/5 |
| 5,556,072 A | 9/1996 | Itoi et al. | |
| 5,628,490 A * | 5/1997 | Roberts et al. | 251/57 |
| 5,664,804 A * | 9/1997 | Saccone | 280/737 |
| 5,820,162 A * | 10/1998 | Fink | 280/742 |
| 5,850,876 A | 12/1998 | Allison et al. | |
| 5,947,143 A * | 9/1999 | Moakes et al. | 137/69 |
| 6,155,284 A * | 12/2000 | Scantlin | 137/70 |
| 6,325,088 B1 * | 12/2001 | Scantlin | 137/70 |
| 6,651,686 B2 * | 11/2003 | Scantlin et al. | 137/70 |
| 7,878,215 B2 | 2/2011 | McLelland et al. | |
| 2006/0016608 A1 | 1/2006 | Simpson et al. | |
| 2006/0137742 A1 * | 6/2006 | Smith et al. | 137/68.13 |

OTHER PUBLICATIONS

The Canadian Requisition mailed Jan. 28, 2014 for Canadian Application No. 2,795,664.

\* cited by examiner

HIGH RATE DISCHARGE (HRD) VALVE OPENING MECHANISM FOR A FIRE AND EXPLOSION PROTECTION

BACKGROUND

This invention relates to a method of and apparatus for the discharge of one or more fire extinguishing agent(s). More particularly, the invention relates to a valve opening mechanism suited to the rapid discharge of fire extinguishing agent(s) and other high mass flow applications.

The invention refers to an apparatus used to rapidly disperse extinguishing agents within a confined space such as the crew compartment of a military vehicle following a fire or explosion event. These automatic fire extinguishing systems (AFES) are deployed after the event has been detected, typically using high speed infrared (IR) and/or ultra violet (UV) sensors. The systems comprise a cylinder filled with extinguishing agent, a fast acting valve and nozzle which enables rapid and efficient deployment of agent throughout the vehicle.

The rapid discharge of a fire extinguishing agent into confined areas of vehicles subsequent to an incident (such as a fuel explosion) is known to suppress the adverse effects experienced by the personnel within the vehicle to survivable levels. Some of the criteria used to determine a survivable event include extinguishing the flame and preventing re-flashing; a reduction in temperature to prevent greater than second degree burns; and the realization of safe levels (i.e. levels up to which personnel can continue to carry out their duties) of overpressure, acid gas, oxygen and concentration of fire extinguishing agent within the vehicle.

A known apparatus for fire extinguishing in such circumstances comprises a generally cylindrical canister which contains a fire extinguishing agent which is pressurized by a gas such as nitrogen. The fire extinguishant agent must be applied rapidly. The outlet for the extinguishant from the canister is typically positioned at the base of the cylinder. A high rate discharge (HRD) valve is operated to allow the discharge of the extinguishing agent. The opening of the valve allows the nitrogen to expand, pushing the extinguishant between it and the valve out through the valve. The orientation of the canister and the location of the outlet in the cylinder allow a high proportion of the extinguishing agent to be discharged rapidly (because the extinguishing agent will be pushed out of the outlet by the nitrogen adjacent the extinguishing agent).

Existing HRD valves, following an actuation, are normally re-furbished away from the vehicle prior to re-use. In certain field conditions this causes logistical and cost issues as both the return of used suppressors and the supply of new or re-furbished hardware to the vehicle is required. In an attempt to minimize this inconvenience, a new design of the HRD valve is being disclosed that can, if required, be disposed of rather than re-furbished. The proposed modified valve may incorporate some common features to the existing valve such as outlet and pressure gauge locations but maintain system efficacy against the fire/explosion challenges.

SUMMARY

In one embodiment, a valve actuation mechanism has a plurality of links. Each link has a proximal end and distal end, and the links are disposed adjacent a valve member. The actuation mechanism also has at least one roller connected to the distal ends of at least two links. The roller contacts a surface of the valve member. In addition, at least one pivot for each link is present in the valve, wherein each pivot is positioned on the proximal end of each of the plurality of links.

In another embodiment, a high speed valve has a valve body having a flow passage therethrough and a poppet disposed within the valve body. The poppet is movable between a first position in which the poppet blocks the flow passage and a second position. The poppet containing a piston connected to a stem at a proximal end of the stem. The valve also has a pivotal link actuation mechanism adjacent a distal end of the stem.

In yet another embodiment, a fire suppression system has a pressure container for holding a fire suppression material that is connected to a high speed valve. The high speed valve has a valve body having a flow passage therethrough and a poppet disposed within the valve body. The poppet is movable between a first position in which the poppet blocks the flow passage and a second position. The poppet containing a piston connected to a stem at a proximal end of the stem. The valve also has a pivotal link actuation mechanism adjacent a distal end of the stem. The system also has a conduit connected to the flow passage of the valve, a nozzle for dispersing the fire suppression material upon opening of the high speed valve.

DETAILED DESCRIPTION

Figure 1:
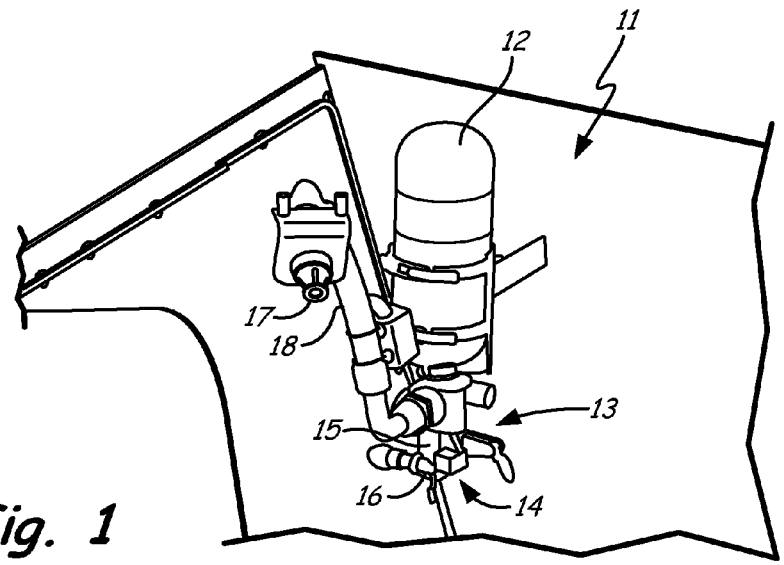
FIG. 1 is a perspective view of prior art apparatus for the discharge of a fire extinguishing agent.

A prior art apparatus 11 for the discharge of a fire extinguishing agent is shown in FIGS. 1-3B. Referring to FIG. 1, apparatus 11 comprises a generally cylindrical canister 12 and a releasing mechanism 13, such as a valve assembly 14 including high rate discharge (HRD) valve 15. The releasing mechanism 13 is opened by solenoid actuator 16. A predetermined mass of fire extinguishing agent is added to the canister 12, which is then super-pressurized with nitrogen. Canister 12 is made from steel or a similarly high strength, rigid material to contain the pressurized extinguishing agent.

When the releasing mechanism 13 is opened the fire extinguishing agent discharges from the canister 12 in a fraction of a second. Canister 12 is usually fitted vertically (that is with its longitudinal axis extending vertically), or as close to vertical as possible, within an enclosed or confined area of a vehicle. In order for the fire extinguishing agent to be distributed homogenously within the confined area without adversely impacting the personnel or equipment contained therein, an outlet nozzle 17 needs to be extended to the highest point thereof, such as where the walls meet the roof. This is achieved in the apparatus 11 by connecting the nozzle 17 to the releasing mechanism 13 via conduit 18, such an appropriate length of hose or pipe.

The vertical orientation of the canister 12 allows releasing mechanism 13 at the outlet of canister 12 to be located at the lowest point. In one embodiment, the fire extinguishant lies at the base of canister 12 (due to its relatively high density), with the nitrogen or a similar fluid pressurizing the space above. When the releasing mechanism 13 is opened, the pressurizing fluid expands and rapidly forces the extinguishant through HRD valve 15, along conduit 18 and out of nozzle 17.

When the fire extinguishing agent is super-pressurized by pressurized fluid within canister 12, a proportion of the fluid dissolves into the fire extinguishant. When HRD valve 15 is operated to deploy the fire extinguishant agent, the rapid expansion of gas dissolved within the fire extinguishing agent causes turbulence within canister 12, which forms a two phase mixture of liquid extinguishing agent and pressurizing fluid, and a foam or mousse is formed.

Figure 2:
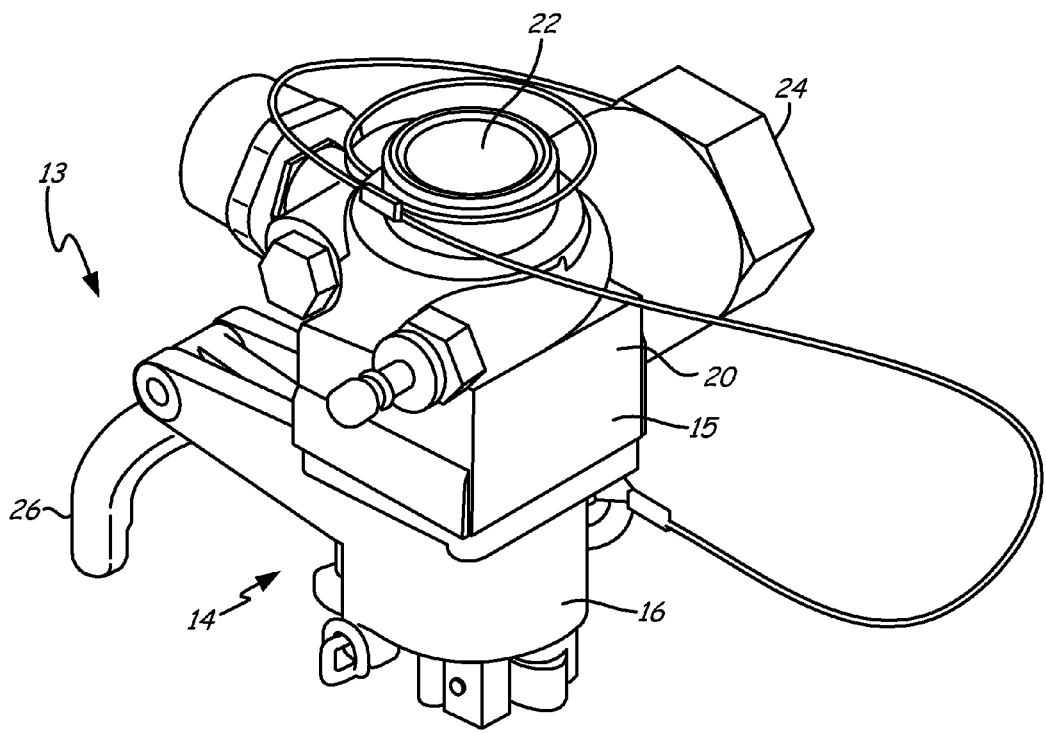
FIG. 2 is a perspective view of a prior art high rate discharge (HRD) valve.
Figure 3B:
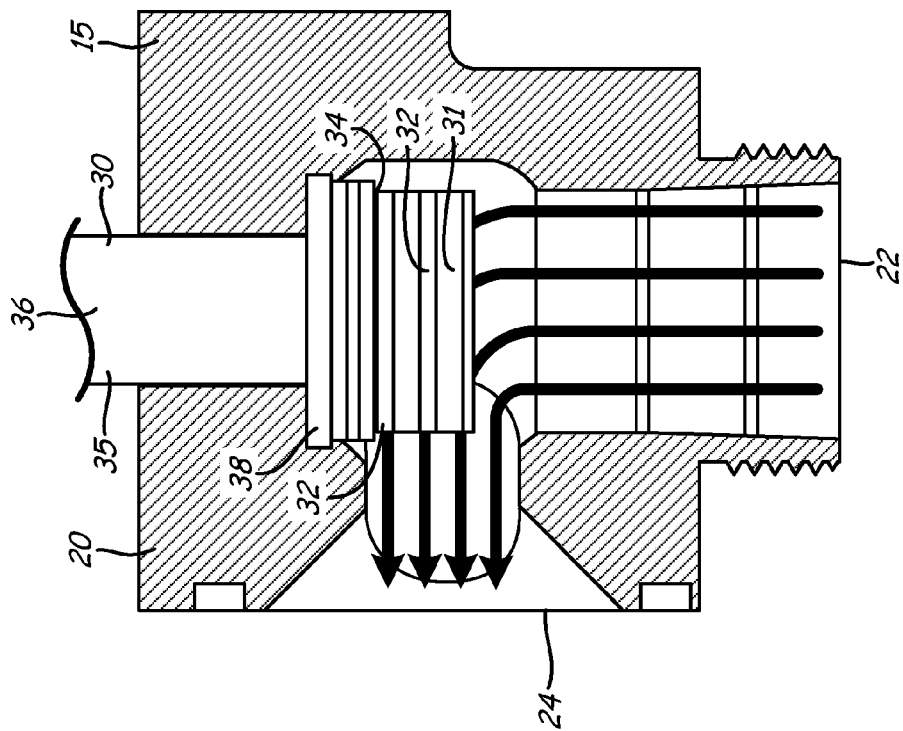
FIG. 3B is a cross-sectional view of the prior art HRD valve in the open position.
Figure 3A:
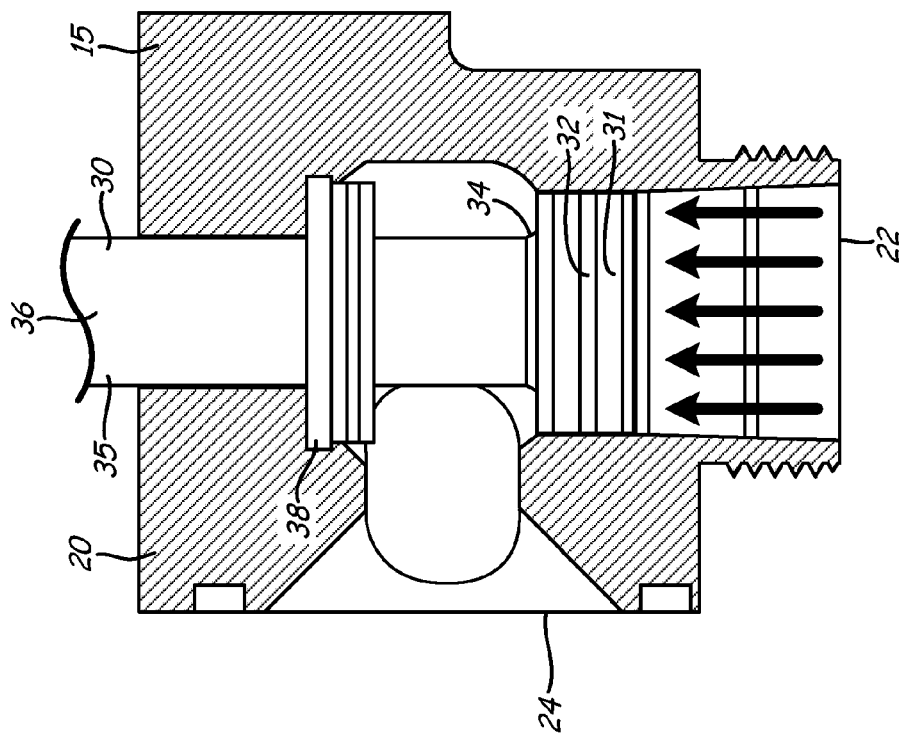
FIG. 3A is a cross-sectional view of the prior art HRD valve in the closed position.

FIG. 2 is a perspective view of a prior art high rate discharge (HRD) valve 15 of valve assembly 14 that also includes release mechanism 13 and solenoid 16. Valve 15 contains hollow body 20 with an elongate bore on a vertical axis that terminates with an opening that forms inlet 22. Hollow body 20 has an enlarged central cavity (as seen in FIGS. 3A and 3B) that communicates laterally with discharge outlet 24. The body of valve 15 is constructed from a metal alloy, or similarly rigid material. Valve 15 also contains mechanical override 26, as well as solenoid 16 for actuating the internal regulating mechanisms of valve 15.

FIGS. 3A and 3B illustrate the internal workings of valve 15. The main operating and regulating mechanism of valve 15 is poppet 30. Poppet 30 is used to close the entrance to an opening in the body of valve 15. Poppet 30 contains a piston 31 at proximate end 34, connected to stem 35 that terminates at distal end 36 adjacent actuating mechanisms, such as mechanical override release mechanism 13 and solenoid 16. Poppet 30 is constructed from a material the same as or similar to that of body 20 of valve 15. Poppet 30 and stem 35 may be of various geometries, such as circular, oval, or polygonal in cross section so long as they match corresponding valve structures, such as the bore opening of inlet 22. In one embodiment, poppet 30 is generally cylindrical, as is stem 35 that is centrally aligned with poppet 30.

One or more annular grooves in piston 31 contain o-rings 32 which compress against the bore of valve 15, providing a seal. O-rings 32 are fabricated from rubber, or a similar elastomeric polymer capable of creating an air-tight seal between poppet 30 and body 20. Pressure inside canister 12 (illustrated in FIG. 1) pushes against proximate end 34 of poppet 30, forcing poppet 30 upward while constraining seals 32 against inlet 22 and canister 12. Once poppet 30 is released, pressurized fluid contained inside canister 12 moves poppet 30 allowing the fluid to escape through outlet 24. An elastomeric bumper 38 quiets the operation and prevents damage to poppet 30 and valve body 20. Following the actuation of the valve via the release mechanism, typically a collet connected to solenoid 16 with mechanical override 26 consisting of a linkage assembly, poppet 30 slides to the open position allowing pressurized fluid, such as a fire extinguishant, to flow out of outlet 24. The use of this common valve body 20 and poppet 30 arrangement allows for high mass flow rates through the valve 15.

Figure 4:
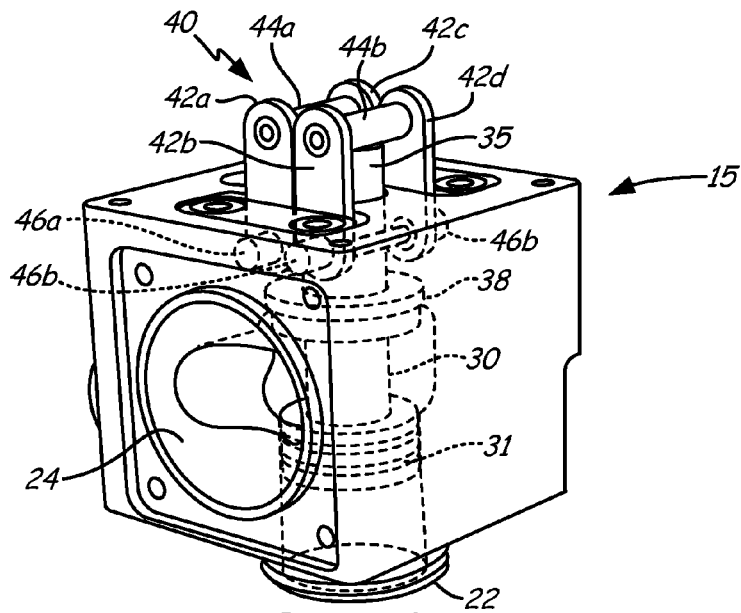
FIG. 4 is a perspective view of an HRD valve with a pivotal-link actuation mechanism.
Figure 5:
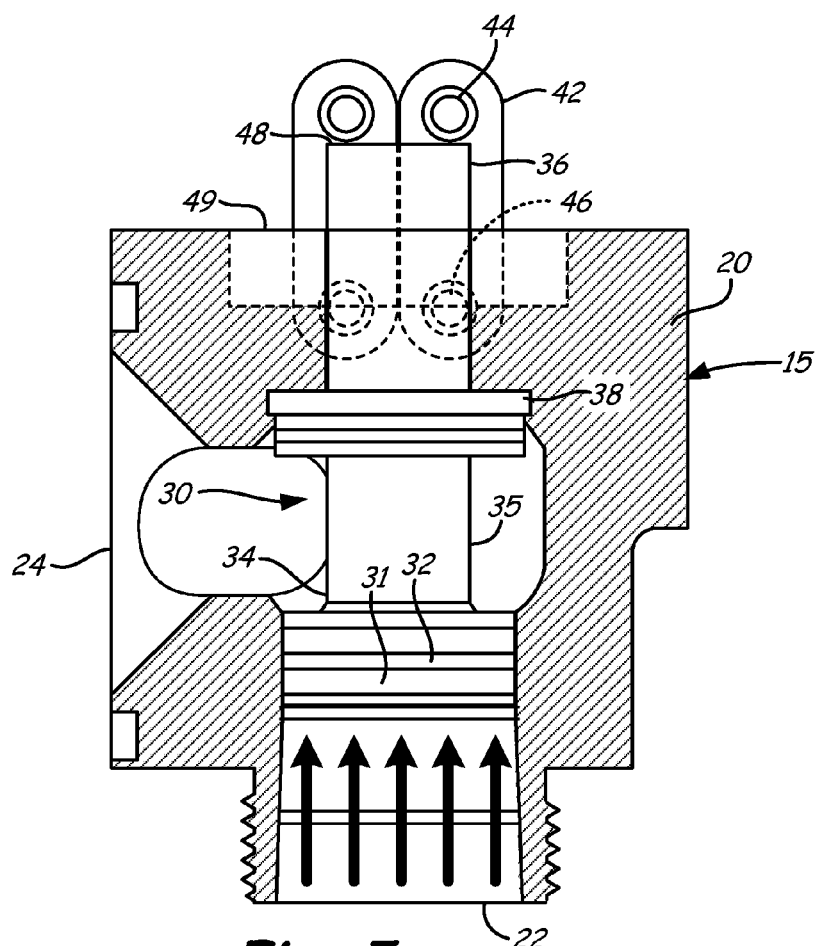
FIG. 5 is a cross-sectional view of the HRD valve with pivotal-link actuation mechanism.

FIGS. 4 to 10 illustrate novel release mechanisms for valve 15. FIG. 4 is a perspective view of HRD valve 15 with a pivotal-link actuation mechanism 40, and FIG. 5 is a cross-sectional view of HRD valve 15 with pivotal-link actuation mechanism 40. Valve 15 contains body 20 with a hollow cavity creating communication between inlet 22 and outlet 24, poppet 30 with piston 31, o-rings 32, and stem 35, and bumper 38 that have all been previously described. Poppet 30 is restrained by pivotal link actuation mechanism 40, which has links 42a-42d, rollers 44a and 44b, and pivots 46a-46b. In the embodiment illustrated, links are flat plate structures with rounded tops and bottoms, and are made from metal. The top and bottom of links 42 contain holes that allow for the attachment of rollers 44 between adjacent links, as well as attachment to pivots 46. Rollers 44 are cylindrical metal rods that extend between adjacent links and are capable of rotation therebetween, forming what is a structure similar to a roller chain. Pivots 46 are short pieced of metal rods attached to body 20 of valve 15. In alternate embodiments, pivots may be machined directly into body 20 during manufacture of valve 15. In the closed position, poppet 30 is constrained vertically by the sets of pivoting links 42 and rollers 44 that contact top surface 48 of stem 35. Links 42 also contact each other in the over-center position. Gap 49 in body 20 of valve 15 allows for the movement of pivotal-link actuation mechanism 40. Gap 49 is a cutout in body 20 that will vary in dimension with differing embodiments, and will be dependent on space requirements for actuation of pivotal-link actuation mechanism 40.

Figure 6:
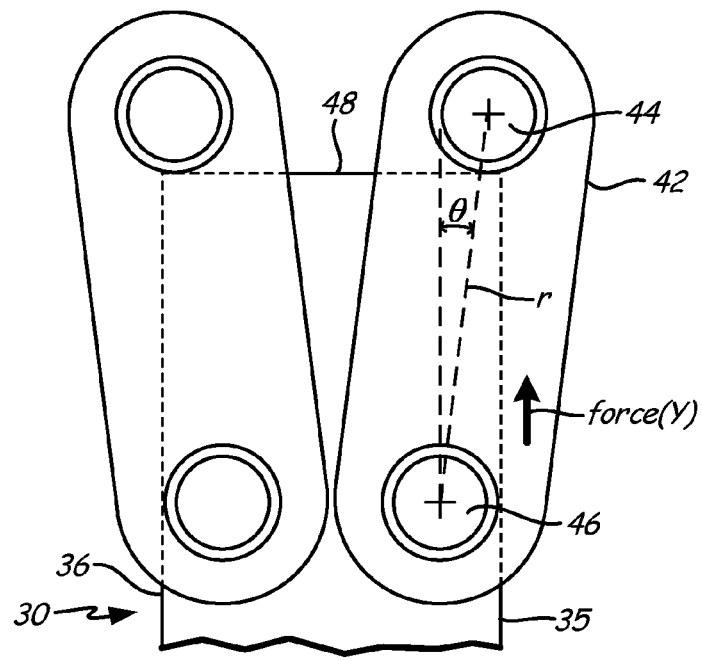
FIG. 6 is an elevation view of the pivotal link actuation mechanism.

For the links to rotate and allow the roller to roll off the edge of the stem 35 (and thus allow movement of poppet 30), there is a slight vertical displacement given by $Y=(r/\cos \theta)-r$. The mechanical advantage is extremely high at a small angle, so a small horizontal force can overcome a very high vertical force. Besides the forces required to move poppet 30, the horizontal force applied to rollers 44 will also have to overcome the drag created by the force against the roller axle, and a small amount of force from pivots 46. FIG. 6 illustrates pivotal link actuation mechanism 40 in operation where the links have been separated, i.e. pivoted, to a point close to allow stem 35 vertical motion.

Figure 7:
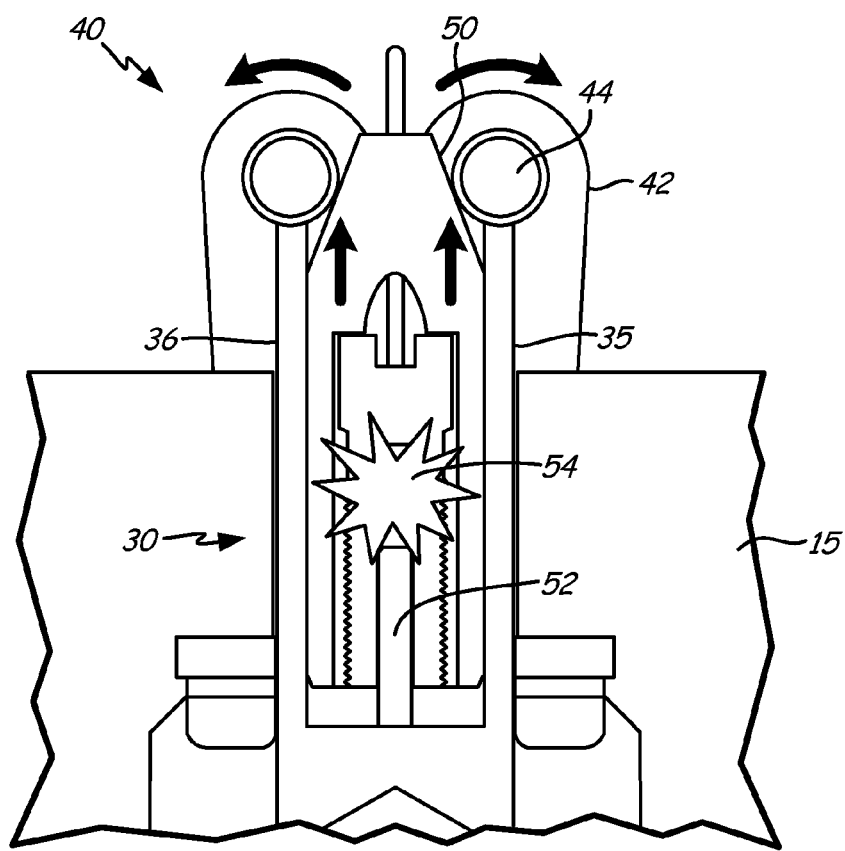
FIG. 7 is a perspective view of another embodiment of an HRD valve.

FIG. 7 is a perspective view of another embodiment of pivotal link actuation mechanism 40 for HRD valve 15. As previously described, poppet 30 is restrained by pivotal link actuation mechanism 40, which has links 42, rollers 44, and pivots 46 (not shown in this view). Stem 35 contains wedge 50 on the exterior of distal end 36, and an electrically actuated rod 52 contained within the interior that acts as a protractor pin. In the embodiment illustrated, links 46 are pushed apart from the center of stem 35 using wedge 50, which is a taper on the pin of stem 35. Wedge 50, along with rod 52 and the electric initiator 54, are mounted below rollers 44 within the body of the poppet 30. On actuation, the electric protractor forces rod 52 out. Typical forces from such devices vary from 1000 N to around 5000 N, though higher and lower values can be provided. In the embodiment illustrated, wedge 50 has two 20° slopes. In an alternate embodiment, distal end 36 of stem 35 is generally conical in shape creating approximately a 20° slope for a portion of stem 35. When combined with the force and linear movement from rod 52, rollers 44 are pushed over the vertical edge of stem 35, which allows poppet 30 to move to the open position. The angle of wedge 50 could be optimized depending on the force and linear motion provided by the actuation device used to open valve 15. This type of operation would work just as well if wedge 50 was used to force links 42 open from the top, but this would also increase the overall space claim of valve 15.

Figure 8:
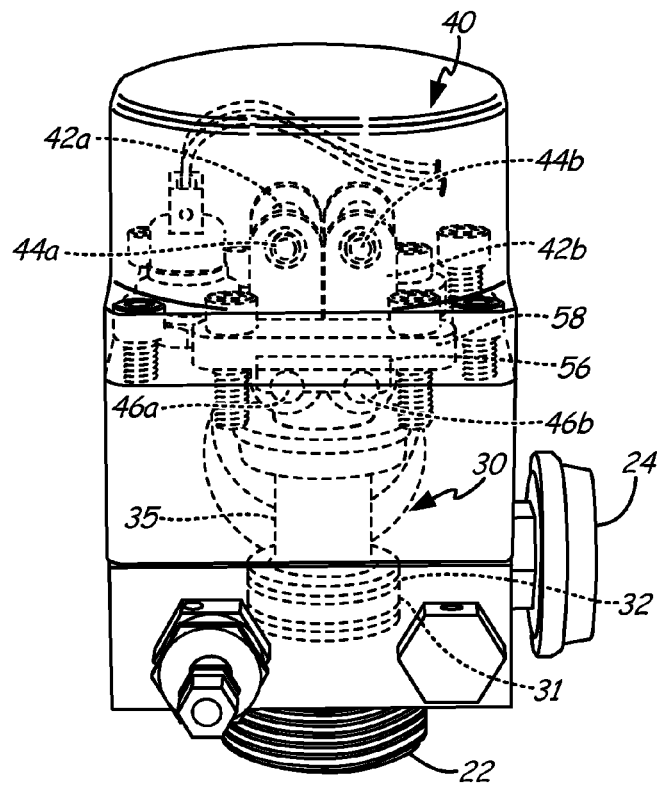
FIG. 8 is another perspective view of the HRD valve.

FIG. 8 is a perspective view of another embodiment of HRD valve 15. Due to normal manufacturing tolerances, one of the two links 42a or 42b will likely be slightly shorter than the other, so the shorter link will take the majority of the load. Poppet 30 can tip slightly to align with the mismatched links, but the tipping may cause additional drag, as well as cause uneven pressure on o-rings 32. The embodiment of illustrated in FIG. 8 features a moving connection mount rocker 56 that carries both links 42a and 42b. Rocker 56 is constrained vertically by backing plate 58. Tapers on both sides of backing plate 58 allow the connection containing rocker 56 to rotate or swing slightly to accommodate mismatched links 42a and 42b—assuring that each link carries equal loads.

Figure 9:
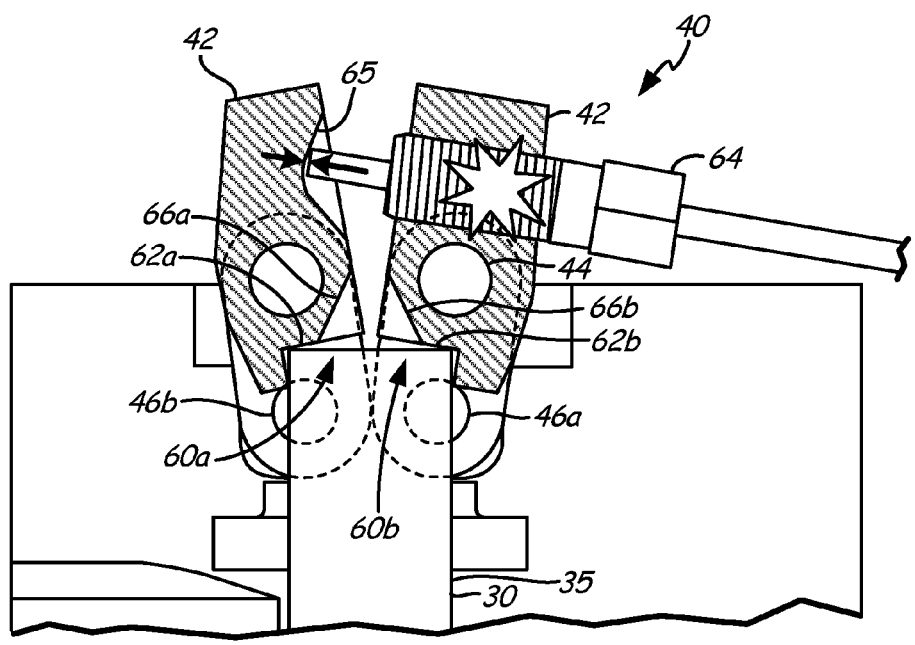
FIG. 9 is an elevation view of another embodiment of the pivotal-link actuation mechanism.

FIG. 9 is an elevation view of another embodiment of pivotal link actuation mechanism 40. In the embodiment illustrated, cut outs 60a and 60b are located just below rollers 46a and 46b on both links 42a and 42b. In the closed position, flat areas 62a and 62b of cut outs 60a and 60b are used to hold poppet 30 in place. A protractor 64 is mounted horizontally within the valve assembly, which on actuation pushes the links 42 apart to the over vertical position and allows poppet 30 to be displaces to open valve 15. Angled portions 66a and 66b of cut outs 60a and 60b allow for stem 35 to clear pivotal link actuation mechanism 40 with minimal rotation of links 46 about pivot points 44. Protractor 64 may be an electronically actuated pyrotechnic device, such as a Metron™ actuator. In one embodiment, a groove 65 is contained within one of the links to allow contact with the actuation mechanism, such as a rod or actuation pin, from protractor 64. The horizontal movement of protractor 64 along with cut outs 62 in links 46 provides a more compact design in terms of the overall valve space envelope required for pivotal link actuation mechanism 40.

Figure 10:
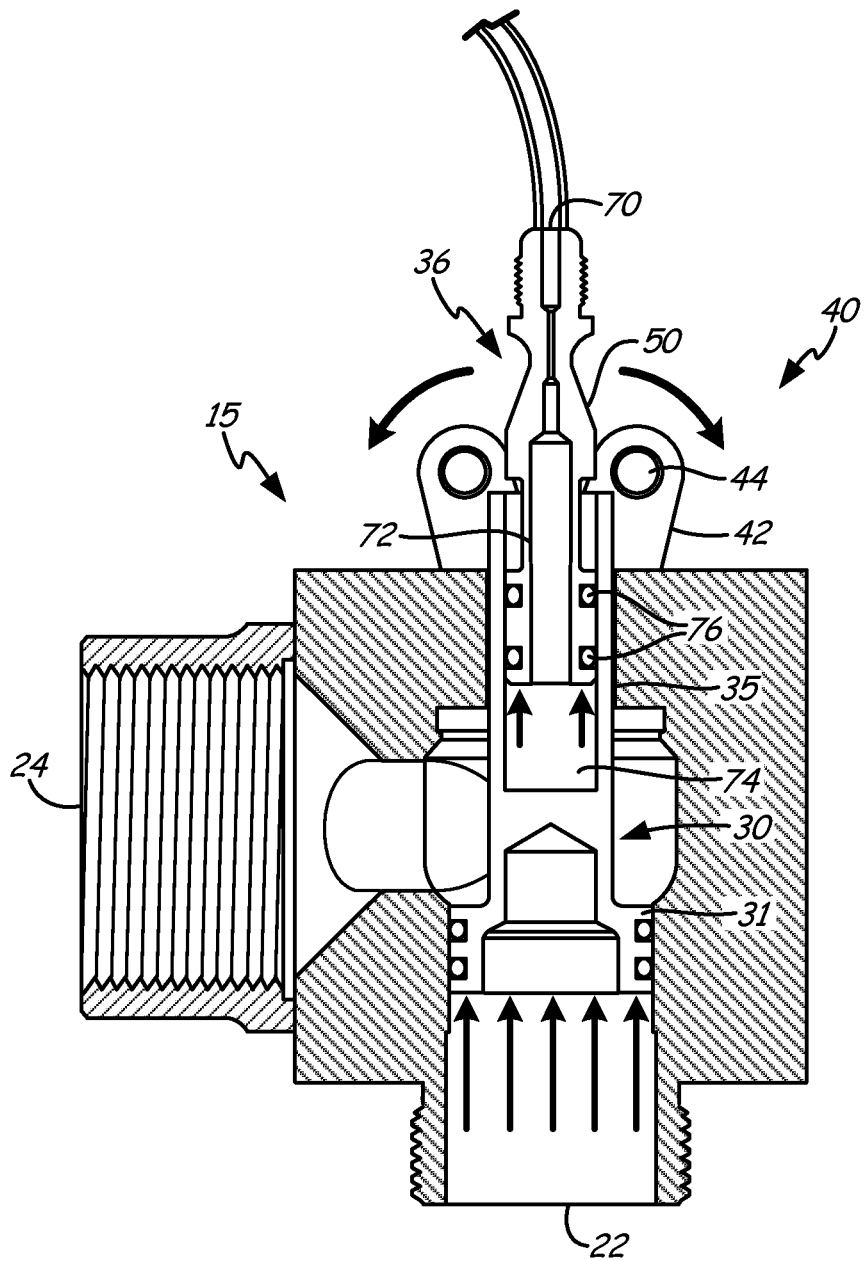
FIG. 10 is a cross-sectional view of yet another embodiment of the HRD valve.

FIG. 10 is a cross-sectional view of yet another embodiment of the HRD valve 15 with pivotal link actuation mechanism 40. As previously described, poppet 30 is restrained by pivotal link actuation mechanism 40, which has links 42, rollers 44, and pivots 46. Stem 35 contains wedge 50 on extending from the top of distal end 36, which is connected to pressure actuated rod 72 contained within interior bore 74 of stem 35. Seals 76 extend around the base portion of actuation rod 72 to create an airtight connection between bore 74 and rod 72. Wedge 50 contains a different geometry than that previously described, and has pressure inlet 70 attached to the top thereof. In the embodiment shown in FIG. 10, pressure is communicated into wedge 50 assembly, the resultant force of which is used to drive wedge 50 up into the linkage assembly. The pressure could be communicated via the extinguisher itself (e.g. with a solenoid valve in line, or other actuation device), or via a separate pressure vessel or canister. An external pressurized canister could be used to operate one or several extinguishers containing the aforementioned and described pivotal link actuation mechanism 40 illustrated in FIG. 10. Optionally, a spring mechanism to store the required energy to operate wedge 50 could be provided that would push rod 72 upward to release poppet 30.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A valve actuation mechanism, comprising:
   a valve member including:
      a hollow bore on an interior of the valve member;
      a moveable rod disposed within the bore; and
      an actuating mechanism attached to the moveable rod;
      wherein the actuating mechanism comprises an electronic protractor;
   a plurality of links, each link with a proximal end and distal end, the links disposed adjacent the valve member;
   at least one roller connected to the distal ends of at least two links, wherein the roller contacts a surface of the valve member; and
   at least one pivot for each link present in the valve, wherein each pivot is positioned on the proximal end of each of the plurality of links.

2. The valve actuation mechanism of claim 1, wherein the valve member contains at least one tapered surface adjacent the plurality of links.

3. The valve actuation mechanism of claim 1, wherein at least one of the plurality of links contains a groove adjacent the distal end.

4. The valve actuation mechanism of claim 1, further comprising:
   a rocker connected between adjacent links and pivots; and
   a tapered backing plated connected to the rocker.

5. A high speed valve, comprising:
   a valve body having a flow passage therethrough;
   a valve member including:
      a hollow bore on an interior of the valve member;
      a moveable rod disposed within the bore; and
      an actuating mechanism attached to the moveable rod;
      wherein the actuating mechanism comprises an electronic protractor;
   a poppet disposed within the valve body, the poppet moveable between a first position in which the poppet blocks the flow passage and a second position, the poppet containing a piston connected to a stem at a proximal end of the stem; and
   a pivotal link actuation mechanism adjacent a distal end of the stem including:
      a plurality of links, each link with a proximal end and a distal end, the links disposed adjacent the valve member;
      at least one roller connected to the distal ends of at least two links, wherein the roller contacts a surface of the valve member; and
      at least one pivot for each link present in the valve, wherein each pivot is positioned on the proximal end of each of the plurality of links.

6. The high speed valve of claim 5, wherein the valve member contains at least one tapered surface adjacent the plurality of links.

7. The high speed valve of claim 5, wherein at least one of the plurality of links contains a groove adjacent the distal end.

8. The high speed valve of claim 5, further comprising:
   a rocker connected between adjacent links and pivots; and
   a tapered backing plated connected to the rocker.

* * * * *